United States Patent  (10) Patent No.: US 7,593,476 B2
Carlson et al.  (45) Date of Patent: *Sep. 22, 2009

(54) DATA SCRAMBLER GENERATION OF PSEUDO-RANDOM BIT SEQUENCE FOR SEMI-STATIONARY Q-MODE SIGNAL

(75) Inventors: Arthur J. Carlson, Nevada City, CA (US); Haixiang Liang, Palo Alto, CA (US)

(73) Assignee: Broadcom Corp.

( * ) Notice: Subject to any disclaimer, the term of this patent is extended or adjusted under 35 U.S.C. 154(b) by 396 days.

This patent is subject to a terminal disclaimer.

(21) Appl. No.: 11/416,541

(22) Filed: May 3, 2006

(65) Prior Publication Data

US 2007/0121755 A1  May 31, 2007

Related U.S. Application Data

(63) Continuation of application No. 09/906,410, filed on Jul. 16, 2001, now Pat. No. 7,054,379.

(60) Provisional application No. 60/241,126, filed on Oct. 16, 2000.

(51) Int. Cl.
*H04L 72/04* (2006.01)
*H04K 1/00* (2006.01)

(52) U.S. Cl. .................................................... 375/295

(58) Field of Classification Search ................ 375/295, 375/219, 222, 259, 260; 455/59, 73; 370/480
See application file for complete search history.

(56) References Cited

U.S. PATENT DOCUMENTS 6,201,830 B1 * 3/2001 Chellali et al. ............. 375/222
6,519,280 B1 * 2/2003 Cole ......................... 375/222

FOREIGN PATENT DOCUMENTS

EP  0535982 A  4/1993
WO  WO-00/52918 A  9/2000

OTHER PUBLICATIONS

Chellali A et al, "Computational Reduction During Idle Transmission in DSL Modems", Acoustics, Speech and Signal Processing, 1988, Proceedings of the 1988 IEEE International Conference in Seattle, WA, USA, May 12-15, 1988, New York, NY, USA, IEEE, vol. 6, pp. 3441-3444, XP010279621 ISBN: 0-7803-4428-6.

* cited by examiner

*Primary Examiner*—Kevin Y Kim
(74) *Attorney, Agent, or Firm*—McAndrews, Held & Malloy, Ltd.

(57) ABSTRACT

In a data communication system, a transmitter of a modem, for example, uses a single scrambler to operate in a data communication mode and in a non-data mode. During the data communication mode the scrambler is used to scramble data for communication by the transmitter. During the non-data mode, the scrambler is used to generate a non-data mode signal for communication by the scrambler. The modem may be an ADSL modem, for example, in which case the data communication mode is SHOWTIME while the non-data mode may be Q-mode.

32 Claims, 12 Drawing Sheets

Fig. 12

DATA SCRAMBLER GENERATION OF PSEUDO-RANDOM BIT SEQUENCE FOR SEMI-STATIONARY Q-MODE SIGNAL

CROSS-REFERENCE TO RELATED APPLICATIONS

The present application is a continuation of U.S. patent application Ser. No. 09/906,410, filed Jul. 16, 2001 now U.S. Pat. No. 7,054,379, the complete subject matter of which is hereby incorporated herein by reference in its entirety.

This application makes reference to, and claims priority to and the benefit of, U.S. provisional application Ser. No. 60/241,126 filed Oct. 16, 2000.

INCORPORATION BY REFERENCE

The above-referenced U.S. provisional application Ser. No. 60/241,126 is hereby incorporated herein by reference in its entirety.

STATEMENT REGARDING FEDERALLY SPONSORED RESEARCH OR DEVELOPMENT

N/A

BACKGROUND OF THE INVENTION

Current ADSL modem system designs do not incorporate a low power transmission mode. Such systems require high power dissipation in the modem line driver, even when no data is being transmitted.

Accordingly, ITU contributions have proposed a low power mode (i.e., "Q-mode,") in the transmitter. During the proposed Q-mode, the modem is still in the ready state, but enters a low power mode during periods of no data transmission.

One ITU contribution, HC-029R1, formally defines a semi-stationary Q-mode signal, that employs a pair of pseudo-random bit sequence ("PRBS") generators, each with a period of greater than 4000. One problem with this proposal, however, is that the receiver would require synchronization to two PRBS generators. In addition, requiring two PRBS generators as such correspondingly requires additional hardware in the modem, as well as additional overhead associated with the overall system. Moreover, during the non-Q-mode periods of operation, i.e., during data mode or "SHOWTIME," the two PRBS generators sit idle.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in communication system having a data communication node. The data communication node may be, for example, a modem (such as an ADSL modem). The data communication node in turn has a transmitter, which itself has a scrambler.

The transmitter uses the scrambler to operate in two modes. The first mode is a data communication mode, which, in the case when the data communication node is an ADSL modem, is SHOWTIME. During the data communication mode, the scrambler is used to scramble data that is communicated by the transmitter.

The second mode is a non-data mode, which in the case when the data communication node is an ADSL transmitter, may be Q-mode. During the non-data mode, the scrambler is used to generate a non-data mode signal.

In one embodiment of the invention, a determination is made whether data is present at one or more inputs to the system. If it is determined that data is present, a determination is then made whether the scrambler is configured for the data communication mode. If it isn't, the scrambler is configured for the data communication mode, and the system operates in that mode. If it is indeed configured for the data communication mode, then the system simply operates in that mode.

If it is determined that no data is present, a determination is then made whether the scrambler is configured for the non-data mode. If it isn't, the scrambler is configured for the non-data mode, and the system operates in that mode. If it is indeed configured for the non-data mode, then the system simply operates in that mode.

In one embodiment of non-data mode operation, a non-data mode input to the scrambler is selected. A non-data mode signal is then generated, using a first output of the scrambler. Next, the non-data mode signal is output, using a second output of the scrambler, for communication by the transmitter. This process is repeated for successive outputs of the scrambler, for as long as the non-data mode input to the scrambler is selected.

These and other advantages and novel features of the present invention, as well as details of an illustrated embodiment thereof, will be more fully understood from the following description and drawings.

DETAILED DESCRIPTION OF THE INVENTION

Figure 1:
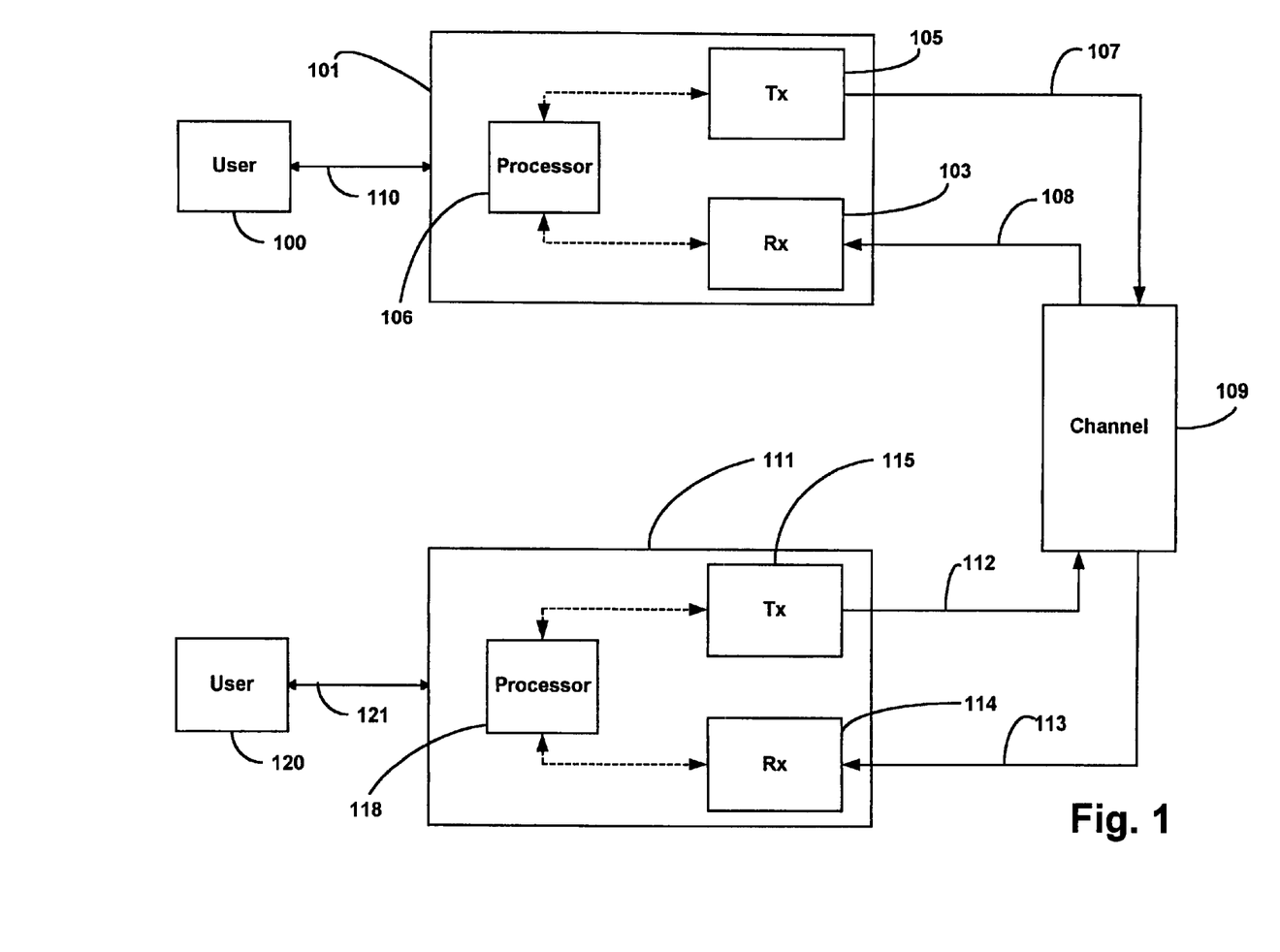
FIG. 1 is a block diagram of a generic communication system that may be employed in connection with the present invention.

FIG. 1 is a block diagram of a generic communication system that may be employed in connection with the present invention. The system comprises a first communication node 101, a second communication node 111, and a channel 109 that communicatively couples the nodes 101 and 111. The communication nodes may be, for example, ADSL modems or any other type of transceiver device that transmits or receives data over a channel. The first communication node 101 comprises a transmitter 105, a receiver 103 and a processor 106. The processor 106 may comprise, for example, a microprocessor. The first communication node 101 is communicatively coupled to a user 100 (e.g., a computer) via communication link 110, and to the channel 109 via communication links 107 and 108.

Similarly, the second communication node 111 comprises a transmitter 115, a receiver 114 and a processor 118. The processor 118, like processor 106, may comprise, for example, a microprocessor. The second communication node 111 is likewise communicatively coupled to a user 120 (again a computer, for example) via communication link 121, and to the channel 109 via communication links 112 and 113.

During operation, the user 100 can communicate information to the user 120 using the first communication node 101, the channel 109 and the second communication node 111. Specifically, the user 100 communicates the information to the first communication node 101 via communication link 110. The information is transformed in the transmitter 105 to match the restrictions imposed by the channel 109. The transmitter 105 then communicates the information to the channel 109 via communication link 107. The receiver 114 of the second communication node 111 next receives, via communication link 113, the information from the channel 109 and transforms it into a form usable by the user 120. Finally, the information is communicated from the second communication node 111 to the user 120 via the communication link 121.

Communication of information from the user 120 to the user 100 may also be achieved in a similar manner. In either case, the information transmitted/received may also be processed using the processors 106/118.

Figure 2:
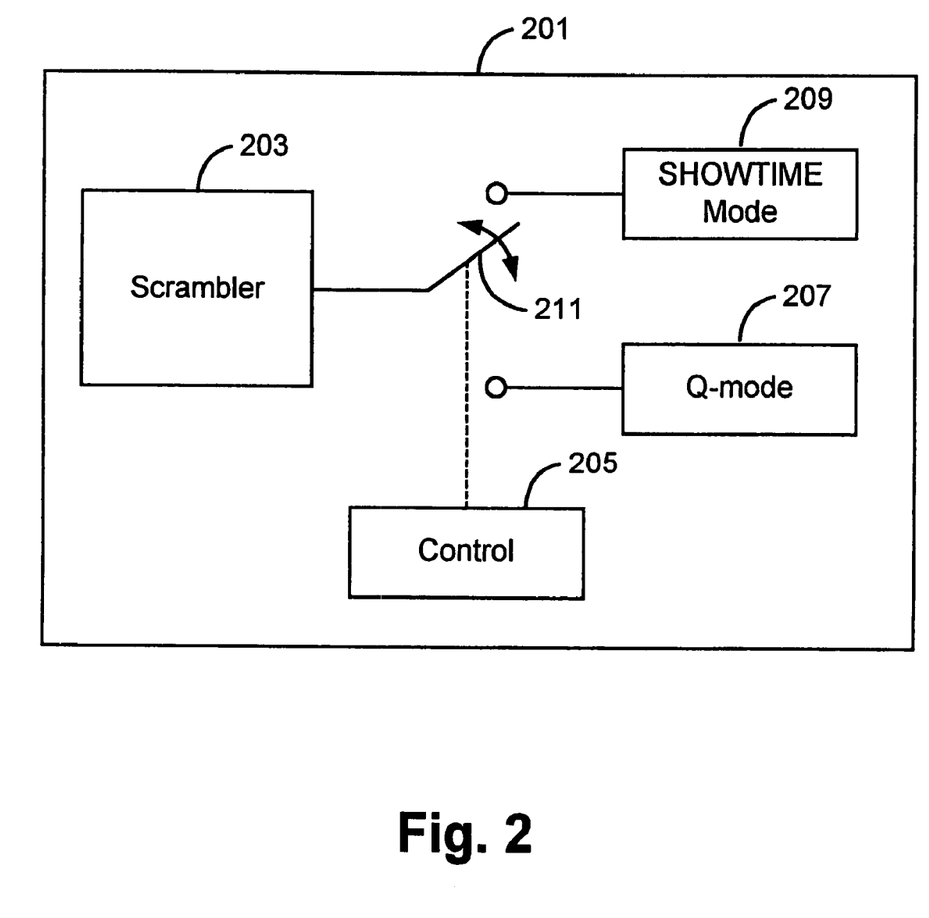
FIG. 2 is a functional block diagram of an ADSL modem transmitter according to the present invention.

FIG. 2 is a functional block diagram of an ADSL modem transmitter according to the present invention. A transmitter 201 comprises a scrambler 203 and control 205. Control 205 causes the transmitter 201 to operate in two different modes, namely a data transmission or "SHOWTIME" mode (designated functionally by block 207) and a non-data mode or "Q-mode" (designated functionally by block 209). The non-data mode may be, for example, a quiescent, low power mode. While a switch 211 is shown in FIG. 2 as selecting between the data and non-data modes, the switch 211 is not necessarily a hardware switch per se, but rather an abstract selection mechanism, as explained more completely below.

Figure 3:
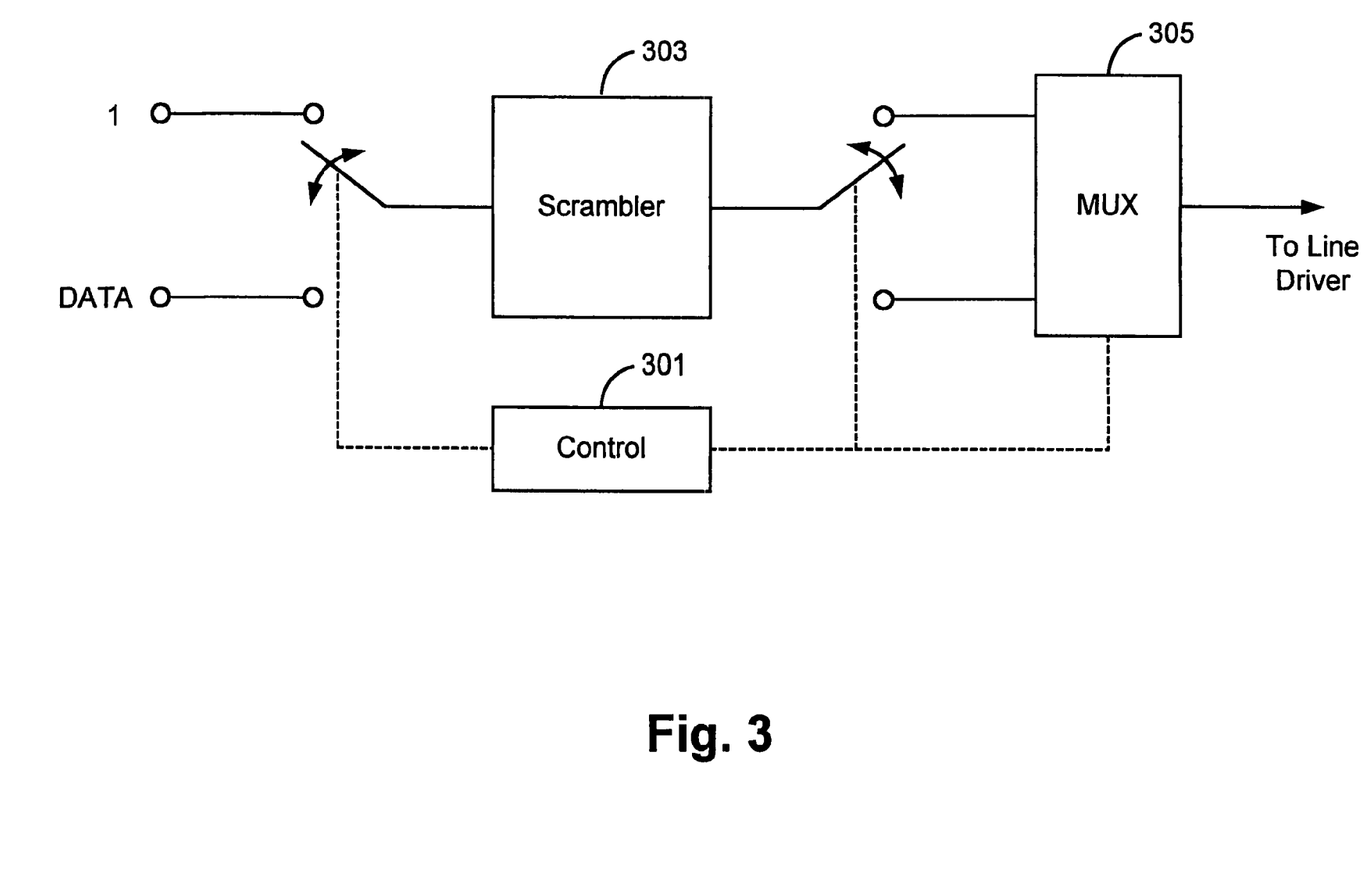
FIG. 3 is a schematic block diagram illustrating one embodiment by which the scrambler of FIG. 2 performs the two functions shown in FIG. 2.

FIG. 3 is a schematic block diagram illustrating one embodiment by which the scrambler of FIG. 2 performs the two functions shown in FIG. 2. Similar to control 205 of FIG. 2, control 301 acts as a selector between Q-mode operation and data operation. In Q-mode, control 301 selects "1" as the input to scrambler 303, employs the scrambler 303 output for Q-mode purposes, and selects the Q-mode signal as the output of multiplexor 305.

In data mode, control 301 selects the input of scrambler 303 to be unscrambled data, employs the output of the scrambler 303 to be scrambled data, and selects the data mode signal as the output of multiplexor 305. In either mode, the output of multiplexor 305 is sent to a line driver (not shown).

As can be appreciated from FIGS. 2 and 3, a single scrambler is used to scramble the data during data transmission and to control the generation of the Q-mode signal.

Figure 4:
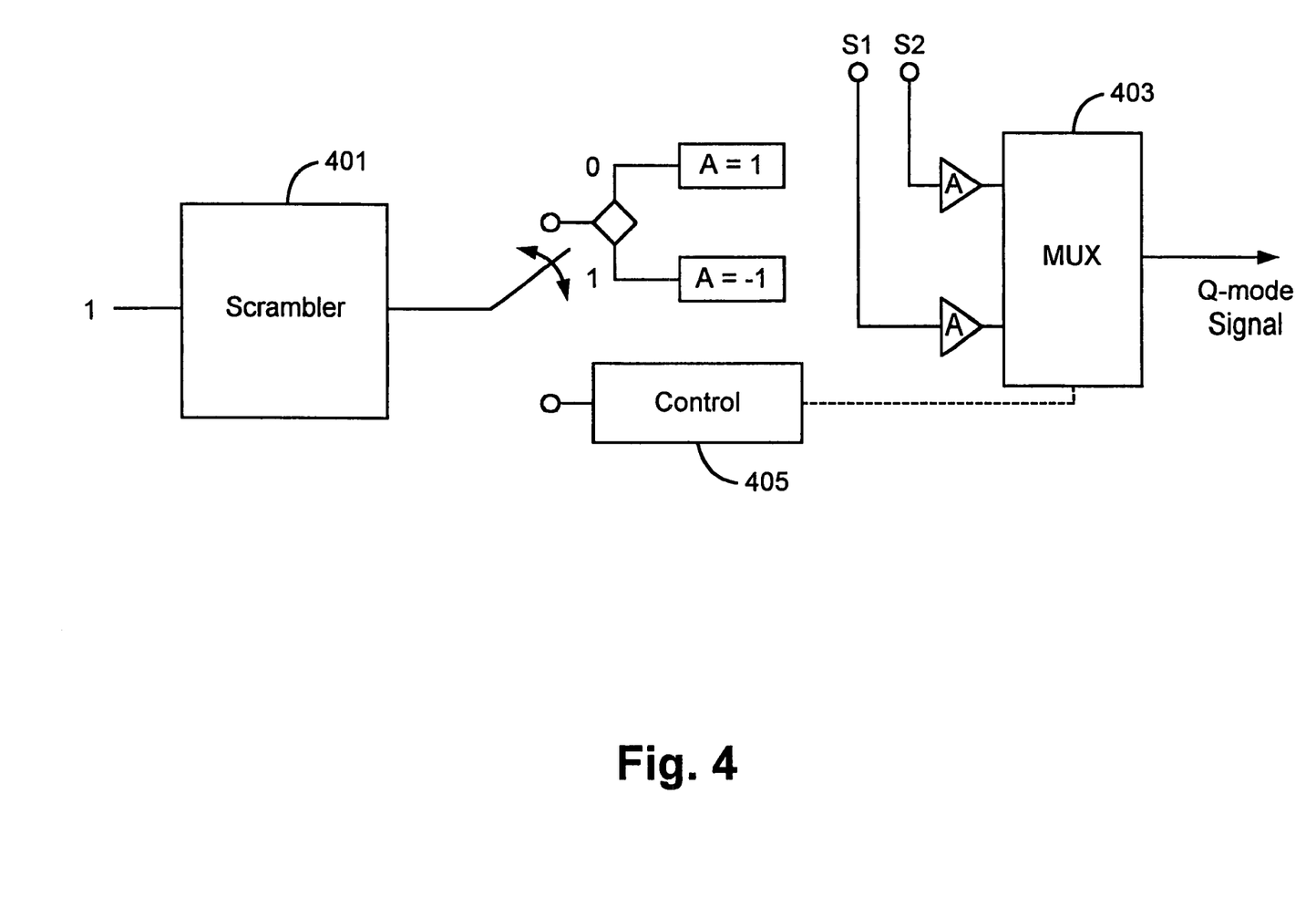
FIG. 4 is a block diagram of one embodiment of Q-mode signal generation circuitry in accordance with the present invention.

FIG. 4 is a block diagram of one embodiment of Q-mode signal generation circuitry in accordance with the present invention. When Qmode is selected (i.e., "1" at the input of scrambler 401), the scrambler 401 switches between generating the Q-mode signal and outputting the Q-mode signal. More specifically, for each symbol of the Q-mode signal, two successive outputs from the scrambler 401 are used. The first output selects whether the basic symbols (i.e., S1 and S2) or their inverses should be generated. In the embodiment of FIG. 4, if the first output is "0," then S1 and S2 are presented at the input of multiplexor 403. If instead the first output is "1," then the inverse of S1 and S2 are presented at the inputs of multiplexor 403.

The second output of scrambler 401 is then presented to control 405, which selects the output of the multiplexor 403. The output of multiplexor 403 represents the Q-mode signal.

Figure 5:
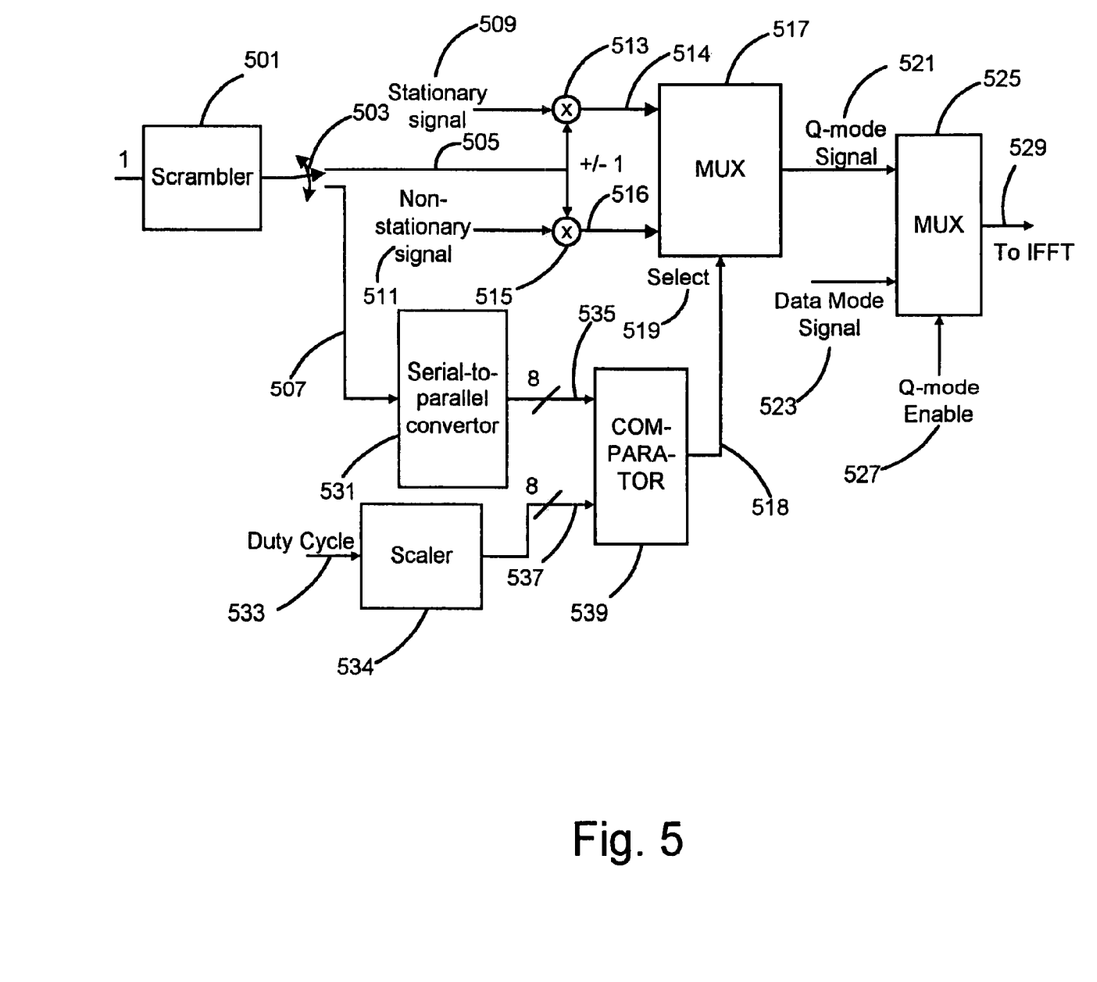
FIG. 5 illustrates a more detailed embodiment of the Q-mode signal generation circuitry of FIG. 4.

FIG. 5 illustrates a more detailed embodiment of the Q-mode signal generation circuitry of FIG. 4. A scrambler 501 with its input clamped to one generates an output sequence of bits at a rate equal to twice the symbol rate of the system. The outputs of the scrambler 501 are alternately connected to a first input 505 and a second input 507 by means of a switch 503. The first input 505 is used by multiplier 513 to either invert or not invert (i.e. multiply by +1 or −1) a stationary signal 509 resulting in a first signal 514. The same first input 505 also is used by multiplier 515 to either invert or not invert a non-stationary signal 511, resulting in a second signal 516. The first signal 514 and the second signal 516 form the inputs to a multiplexor 517.

The second input 507 is applied to the input of a serial-to-parallel convertor 531 that converts groups of bits from the second input 507 to a first 8-bit integer 535. A duty cycle 533 (i.e. a positive number between 0 and 1) is scaled in scaler 534 to an 8-bit positive integer (i.e., an integer between 0 and 255 inclusive) to produce a second 8-bit integer 537. A comparator 539 produces an output 518 that is 1 whenever the first 8-bit integer 535 is less than the second 8-bit integer 537; the output 518 is 0 otherwise. The output 518 is the select input 519 of multiplexor 517. The output of multiplexor 517 is Q-mode signal 521, which is comprised of first signal 514 whenever the select input 519 is "1," and second signal 516 whenever the select input 519 is "0."

A final multiplexor 525, operating under control of Q-mode enable 527, has an output signal 529 that is Q-mode signal 521 whenever Q-mode enable 527 is 1; the output signal 529 is the data mode signal 523 whenever Q-mode enable 527 is "0." Subsequent processing stages in the ADSL transmitter convert the output signal 529 into a signal that is transmitted by the ADSL transmitter.

Figure 6:
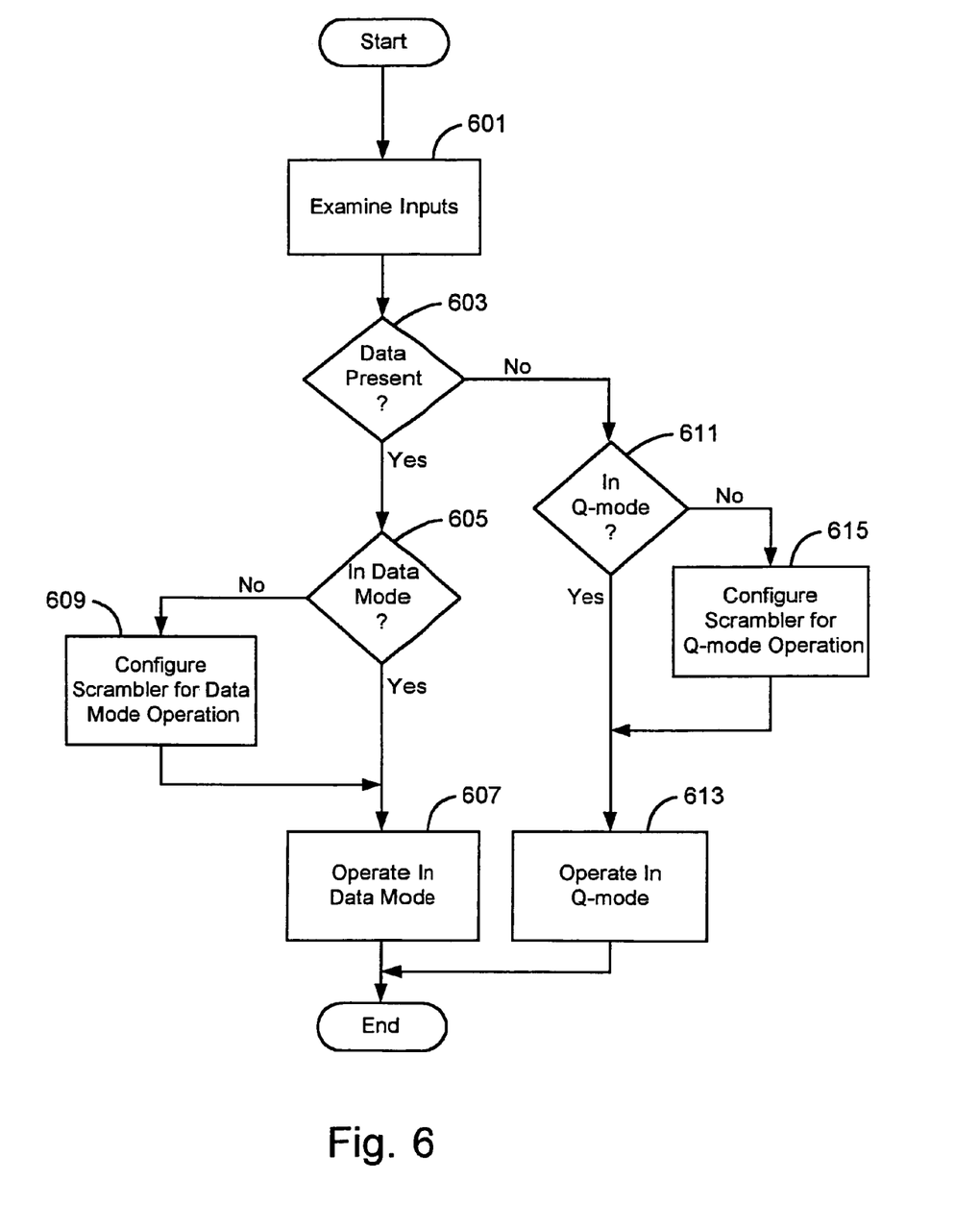
FIG. 6 is a flow diagram of overall control for mode selection in accordance with the present invention.

FIG. 6 is a flow diagram of overall control for mode selection in accordance with the present invention. First, inputs to the system are examined (block 601). "Inputs" may be, for example, user data, internally generated overhead data (e.g., system status or commands), etc., or no data at all. If it is determined that data is present at the inputs (block 603), then a determination is made whether the system is in the data mode (block 605). If the system is indeed in the data mode, the system simply operates in the data mode (block 607). If it is not in the data mode (as determined at block 605), the system first configures the scrambler for data mode operation (block 609), and then operates in the data mode (block 607).

If, on the other hand, it is determined that no data is present at the inputs (block 603), then a determination is made whether the system is in Q-mode (block 611). If the system is indeed in Q-mode, the system simply operates in Q-mode (block 613). If it is not in Q-mode (as determined at block 611), the system first configures the scrambler for Q-mode operation (block 615), and then operates in Q-mode (block 613).

Figure 7:
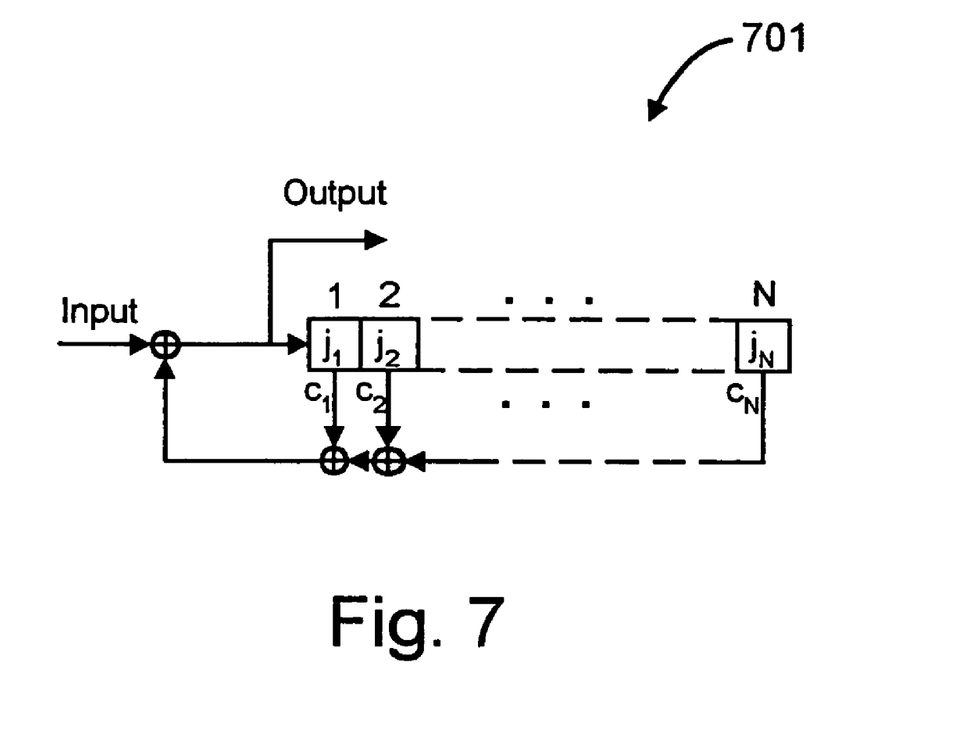
FIG. 7 is a depiction of a generic scrambler that may be employed in connection with the present invention.

FIG. 7 is a depiction of a generic scrambler that may be employed in connection with the present invention. Scrambler 701 outputs a pseudo random bit sequence with a period of $2^N-1$, where each of $j_1, j_2, \ldots j_N$ comprises one of "0" or "1" and $\{j_1, j_2, \ldots j_N\}$ (not all equal to "1") represents the initial state of the scrambler 701. $\{c_1, c_2 \ldots c_N\}$ represents the coefficients of a primitive polynomial.

Figure 8:
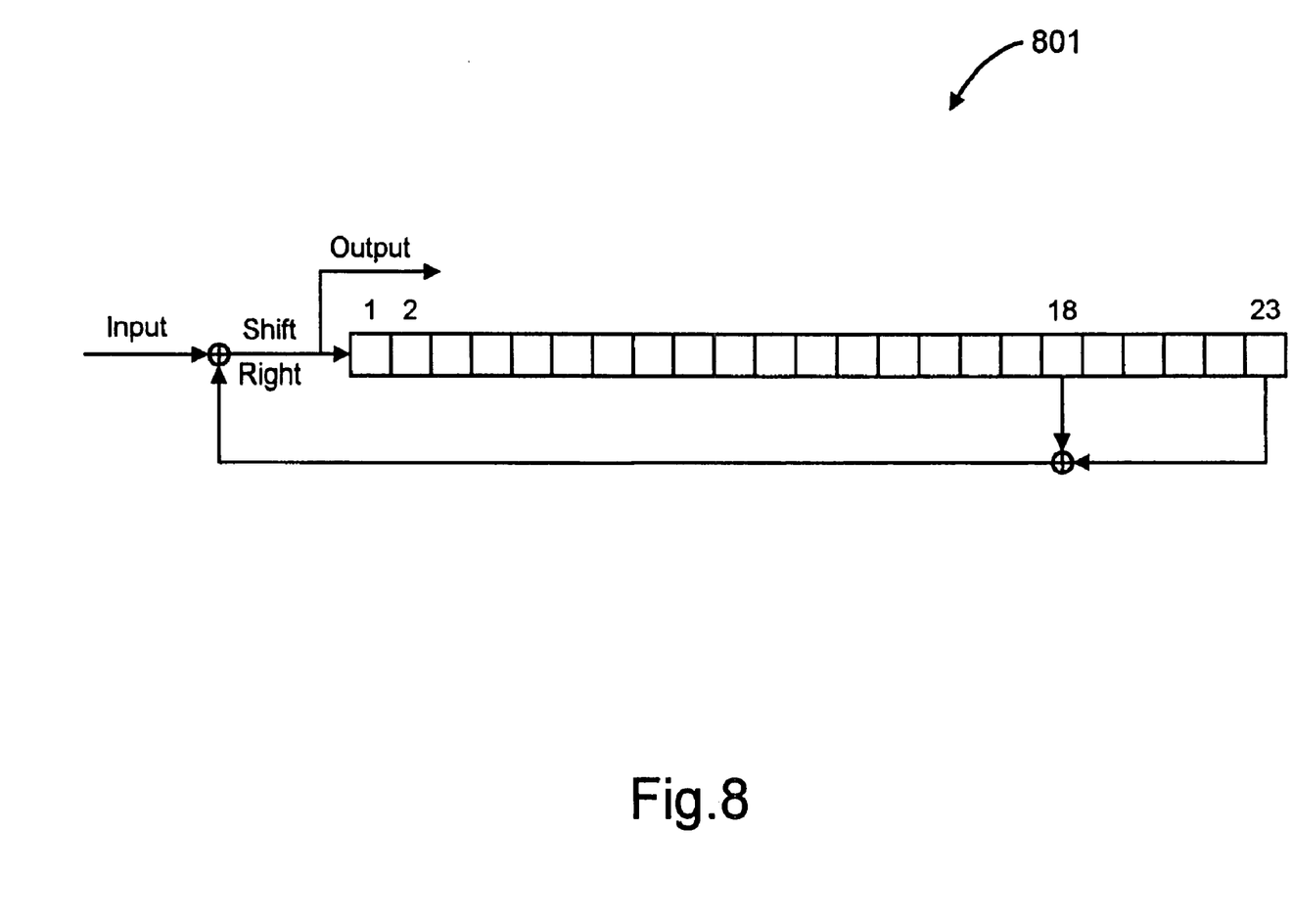
FIG. 8 is one specific embodiment of a scrambler that may be employed in connection with the present invention.

FIG. 8 is one specific embodiment of the scrambler of FIG. 7 that may be employed in connection with the present invention. Scrambler 801 is defined for ADSL data transmission in G.992.1 and G.992.2. The scrambler 801 of FIG. 8 is based on the primitive polynomial $1 \oplus x^{-18} \oplus x^{-23}$ with the $\oplus$ symbol used to denote addition mod 2. When the scrambler 801 input is clamped to "1," the scrambler 801 output becomes a pseudo-random bit sequence with a period of $2^{23}-1$.

To consider the randomness qualities of the scrambler of FIG. 8, let the sequence $\{a_j, a_{j+1}, a_{j+2}, \ldots\}$ represent the output sequence emitted by the scrambler with its input clamped to one where j is an arbitrary integer representing time. Assume further that the initial state of the scrambler is $\{a_{j+1}, a_{j+2}, \ldots, a_{j+23}\}$ for some j. Then subsequent outputs of the scrambler are defined by the above primitive polynomial to be $$a_i = 1 \oplus a_{i-18} \oplus a_{i-23} \text{ for all integer values of i.} \quad (1)$$

Equivalently, $$a_i \oplus a_{i-18} \oplus a_{i-23} = 1, \quad (2)$$

it being understood that binary arithmetic is being used.

Equation (2) expresses the fundamental recurrence relation for the scrambler of FIG. 8. Further properties of this scrambler make it attractive for generating pseudo-random sequences. Of course, a whole family of scramblers can be defined in a similar way.

Figure 9:
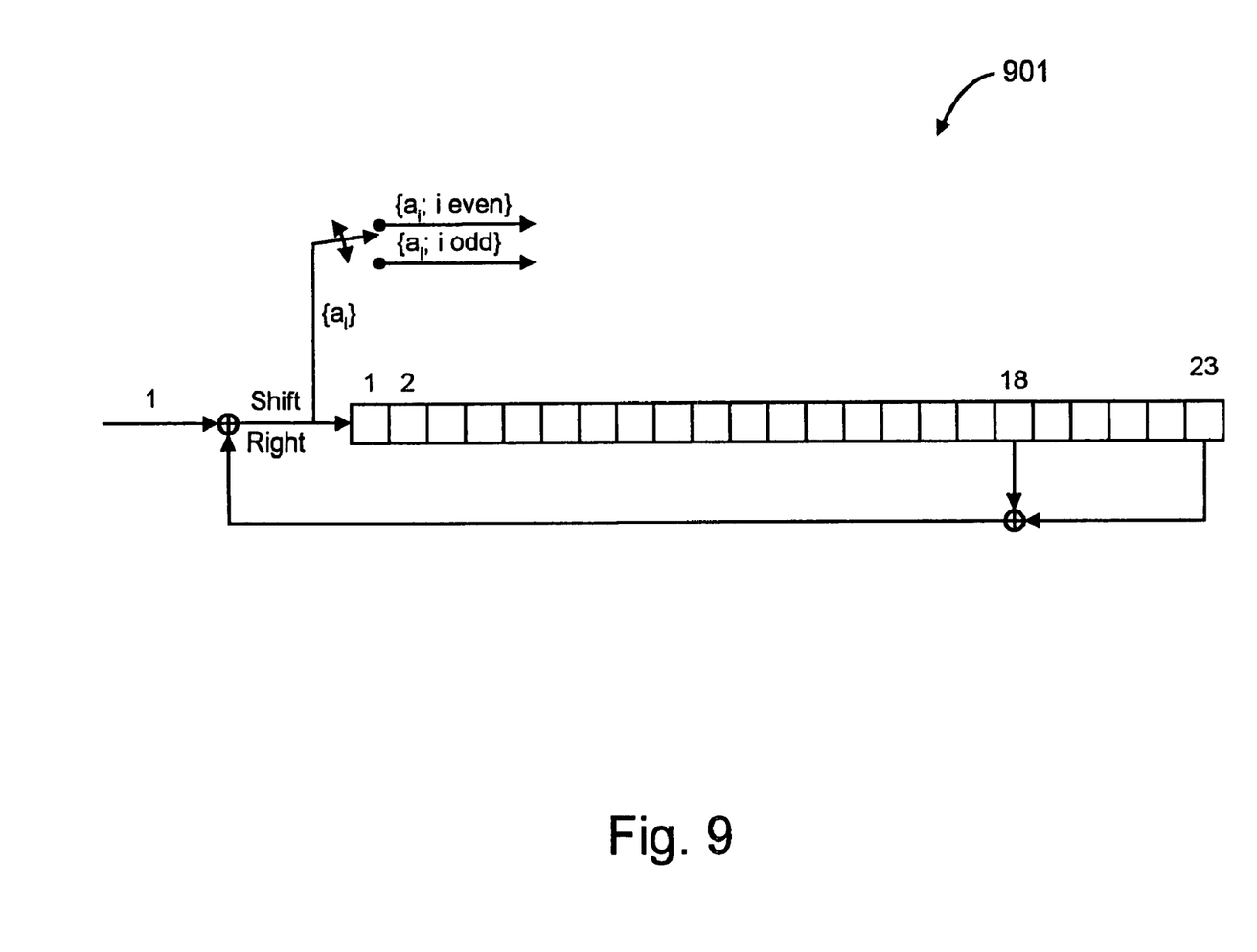
FIG. 9 is a scrambler based on the scrambler of FIG. 8 but with alternate outputs selected in such a way that two separate output streams are produced.

Consider the structure of scrambler 901 of FIG. 9, which is based on the scrambler of FIG. 8 but with alternate outputs selected in such a way that two separate output streams are produced. To determine the randomness properties of the resulting subsequences, let $\{b_i\}$ represent the output sequence obtained by selecting the even-numbered outputs of the master scrambler. That is, let $$b_i = a_{2i} \text{ for all i.} \quad (3)$$

It is asserted that the $\{b_i\}$ sequence defined by (3) also satisfies Equation (2), which means that $\{b_i\}$ is also a PRBS sequence with all the properties possessed by the $\{a_j\}$ sequence. That is, it is asserted that $$b_i \oplus b_{i-18} \oplus b_{i-23} = 1. \quad (4)$$

Substituting (3) into (4), the assertion is that $$a_{2i} \oplus a_{2i-36} \oplus a_{2i-46} = 1. \quad (5)$$

To prove this assertion, note that from (1) we know that $$a_{2i} = 1 \oplus a_{2i-18} \oplus a_{2i-23}, \quad (6)$$

$$a_{2i-18} = 1 \oplus a_{(2i-18)-18} \oplus a_{(2i-18)-23}$$
$$= 1 \oplus a_{2i-36} \oplus a_{2i-41}$$

from which $$a_{2i-36} = 1 \oplus a_{2i-18} \oplus a_{2i-41} \quad (7)$$

Also from (1), $$a_{2i-23} = 1 \oplus a_{(2i-23)-18} \oplus a_{(2i-23)-23}$$
$$= 1 \oplus a_{2i-41} \oplus a_{2i-46}$$

from which $$a_{2i-46} = a_{2i-23} \oplus a_{2i-41}. \quad (8)$$

Substituting (7) and (8) into the left-hand side of (5) we have $$a_{2i} \oplus 1 \oplus a_{2i-18} \oplus a_{2i-41} \oplus 1 \oplus a_{2i-23} \oplus a_{2i-41} = a_{2i-41} \oplus a_{2i-18} \oplus a_{2i-23} \quad (9)$$
$$= 1 \quad (10)$$

from (2) with i replaced by 2i. The chain of implications just navigated shows that $$b_i \oplus b_{i-18} \oplus b_{i-23} = 1 \quad (4)$$

as was asserted. Therefore, the sequence, $\{b_i\}$ obtained by selecting the even-numbered outputs of the master scrambler is, itself, a PRBS sequence with the same randomness properties as that of the master scrambler. A similar argument proves that the sequence obtained by selecting the odd-numbered outputs of the master scrambler also is a PRBS sequence with the same randomness properties as the master scrambler.

Figure 10:
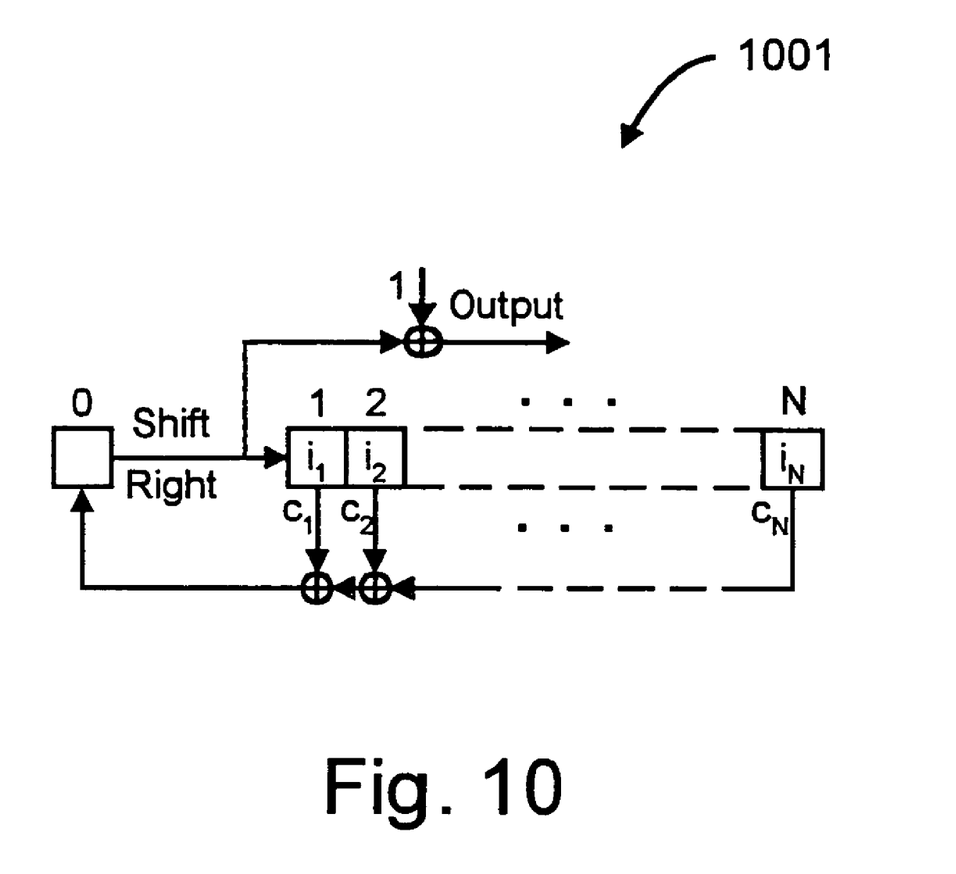
FIG. 10 is a depiction of a generic PRBS generator in accordance with the present invention.

An embodiment with exactly similar properties (except that the bit sequence is inverted) obtains when a PRBS generator is substituted for the scrambler. FIG. 10 is a depiction of a generic PRBS generator that may be employed in connection with the present invention. PRBS generator 1001 outputs a pseudo random bit sequence with a period of $2^N-1$, where each of $i_1, i_2, \ldots i_N$ comprises one of "0" or "1" and $\{i_1, i_2, \ldots i_N\}$ (not all equal to "0") represents the initial state of the PRBS generator 1001. $\{c_1, c_2 \ldots c_N\}$ represents the coefficients of a primitive polynomial.

Figure 11:
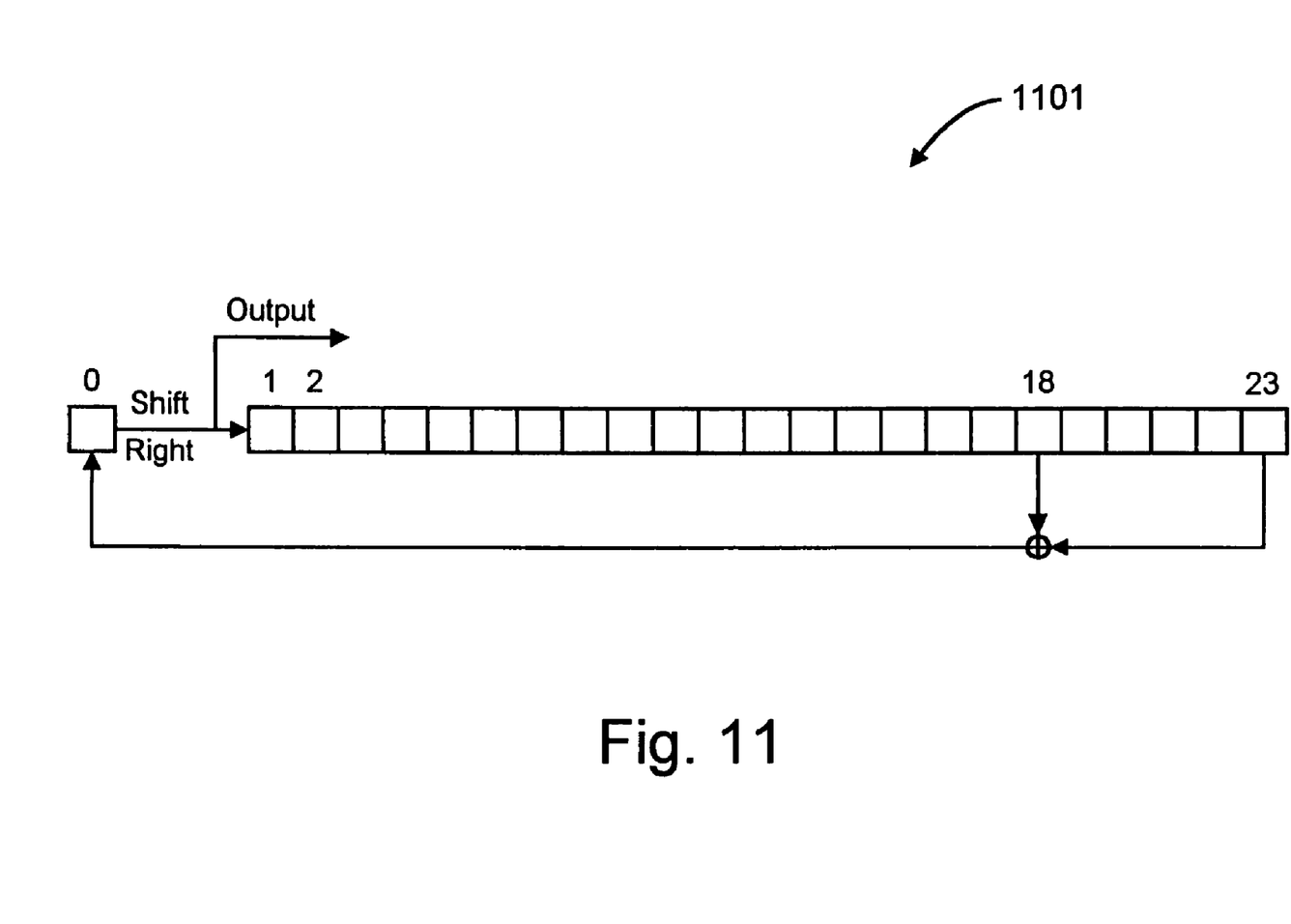
FIG. 11 is one specific embodiment of the PRBS generator of FIG. 10 in accordance with the present invention.

FIG. 11 is one specific embodiment of the PRBS generator of FIG. 10 in accordance with the present invention. The PRBS generator 1101 of FIG. 11 is based on the same polynomial as that upon which FIG. 8 is based. To consider the randomness qualities of FIG. 11, let the sequence $\{a_j, a_{j+1}, a_{j+2}, \ldots\}$ represent the output sequence emitted by the PRBS where j is an arbitrary integer representing time. Assume further that the initial state of the generator is $\{a_{j+1}, a_{j+2}, \ldots, a_{j+23}\}$ for some j. Then subsequent outputs of the PRBS generator are defined by the above primitive polynomial to be $$a_i = a_{i-18} \oplus a_{i-23} \text{ for all integer values of i.} \quad (1)$$

Equivalently, $$a_i \oplus a_{i-18} \oplus a_{i-23} = 0, \quad (2)$$

it being understood that binary arithmetic is being used.

Equation (2) expresses the fundamental recurrence relation for the PRBS generator. Further properties of. this PRBS generator make it attractive for generating pseudo-random sequences. Of course, a whole family of PRBS generators can be defined in a similar way.

Figure 12:
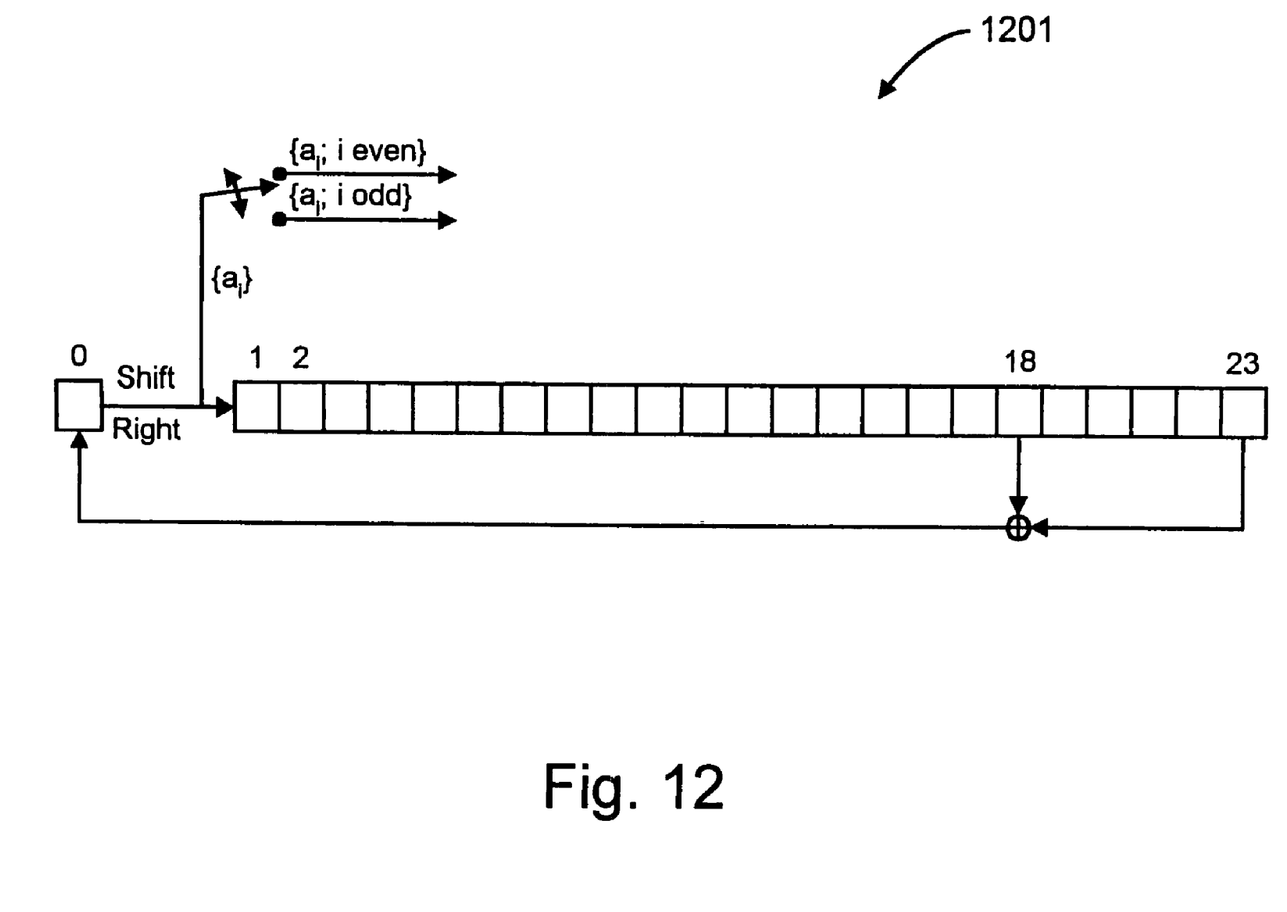
FIG. 12 is a PRBS generator based on the PRBS generator of FIG. 11, but with alternate outputs selected in such a way that two separate output streams are produced, in accordance with the present invention.

Consider the structure of PRBS generator 1201 of FIG. 12, which is based on the PRBS generator of FIG. 11, but with alternate outputs selected in such a way that two separate output streams are produced (in accordance with the present invention). To consider the randomness qualities of the scrambler 1201 of FIG. 12, let $\{b_i\}$ represent the output sequence obtained by selecting the even-numbered outputs of the master PRBS generator. That is, let $$b_i = a_{2i} \text{ for all } i. \tag{3}$$

It is asserted that the $\{b_i\}$ sequence defined by (3) also satisfies Equation (2), which means that $\{b_i\}$ is also a PRBS sequence with all the properties possessed by the $\{a_i\}$ sequence. That is, it is asserted that $$b_i \oplus b_{i-18} \oplus b_{i-23} = 0. \tag{4}$$

Substituting (3) into (4), the assertion is that $$a_{2i} \oplus a_{2i-36} \oplus a_{2i-46} = 0. \tag{5}$$

To prove this assertion note that from (1) we know that $$a_{2i} = a_{2i-18} \oplus a_{2i-23}, \tag{6}$$

$$\begin{aligned} a_{2i-18} &= a_{(2i-18)-18} \oplus a_{(2i-18)-23} \\ &= a_{2i-36} \oplus a_{2i-41} \end{aligned}$$

from which $$a_{2i-36} = a_{2i-18} \oplus a_{2i-41} \tag{7}$$

Also from (1), $$\begin{aligned} a_{2i-23} &= a_{(2i-23)-18} \oplus a_{(2i-23)-23} \\ &= a_{2i-41} \oplus a_{2i-46} \end{aligned}$$

from which $$a_{2i-46} = a_{2i-23} \oplus a_{2i-41} \tag{8}$$

Substituting (6), (7), and (8) into the left-hand side of (5) we have $$a_{2i} \oplus a_{2i-18} \oplus a_{2i-41} \oplus a_{2i-23} \oplus a_{2i-41} = a_{2i} \oplus a_{2i-18} \oplus a_{2i-23} \tag{9}$$

$$= 0 \tag{10}$$

from (2) with i replaced by 2i. The chain of implications just navigated shows that $$b_i \oplus b_{i-18} \oplus b_{i-23} = 0 \tag{4}$$

as asserted. Therefore, the sequence, $\{b_i\}$, obtained by selecting the even-numbered outputs of the master PRBS generator is, itself, a PRBS sequence with the same randomness properties as that of the master PRBS generator. A similar argument proves that the sequence obtained by selecting the odd-numbered outputs of the master PRBS generator also is a PRBS sequence with the same randomness properties as the master PRBS generator.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A communication system comprising:
    a transmitter capable of:
        determining that data is not present at at least one input to the transmitter;
        determining whether the transmitter is configured for a non-data mode;
        configuring the transmitter for the non-data mode if a determination is made that the transmitter is not configured for the non-data mode; and
        operating in the non-data mode.

2. The communication system of claim 1 further comprising being capable of:
    determining whether the transmitter is configured for a data communication mode;
    configuring the transmitter for the data communication mode if a determination is made that the transmitter is not configured for the data communication mode;
    operating in the data communication mode.

3. The communication system of claim 1 wherein operating in the non-data mode comprises generating, at least partially, a non-data signal.

4. The communication system of claim 2 wherein operating in the data communication mode comprises scrambling data received at the at least one input.

5. The communication system of claim 2 wherein the transmitter is located in an ADSL modem.

6. The communication system of claim 5 wherein the data communication mode comprises SHOWTIME.

7. The communication system of claim 6 wherein operating in the data communication mode comprises scrambling data during SHOWTIME.

8. The communication system of claim 5 wherein the non-data mode comprises a Q-mode.

9. The communication system of claim 8 wherein operating in the non-data mode comprises generating, at least partially, a Q-mode signal.

10. A communication system comprising:
    a transmitter being capable of:
        generating, using a first output of two successive outputs, a non-data mode signal; and
        controlling, using a second output of said two successive outputs, the output of the non-data mode signal.

11. The communication system of claim 10 further being capable of selecting a non-data mode input.

12. The communication system of claim 11 further comprising being capable of repeating the generating and controlling for as long as the non-data mode input is selected.

13. The communication system of claim 10 further comprising the transmitter being capable of:
    selecting a data communication mode input; and
    scrambling data received for communication.

14. The communication system of claim 13 wherein the transmitter is located in an ADSL modem.

15. The communication system of claim 14 wherein the data communication mode comprises SHOWTIME.

16. The communication system of claim 14 wherein the non-data mode comprises a Q-mode.

17. A method of operating a transmitter in a data communication system, the method comprising:
    determining that data is not present at at least one input;
    determining whether the transmitter is configured for a non-data mode;

configuring the transmitter for the non-data mode if a determination is made that the transmitter is not configured for the non-data mode; and operating in the non-data mode.

18. The method of claim 17 further comprising:

determining that data is present at the least one input;

determining whether the transmitter is configured for a data communication mode;

configuring the transmitter for the data communication mode if a determination is made that the transmitter is not configured for the data communication mode; and operating in the data communication mode.

19. The method of claim 18 wherein operating in the data communication mode comprises scrambling data received at the at least one input.

20. The method of claim 17 wherein operating in the non-data mode comprises generating, at least partially, a non-data signal.

21. The method of claim 18 wherein the transmitter is located in an ADSL modem.

22. The data communication system of claim 21 wherein the data communication mode comprises SHOWTIME.

23. The data communication system of claim 22 wherein operating in the data communication mode comprises scrambling data during SHOWTIME.

24. The data communication system of claim 21 wherein the non-data mode comprises a Q-mode.

25. The data communication system of claim 24 wherein operating in the non-data mode comprises generating, at least partially, a Q-mode signal.

26. A method of operating a transmitter in a data communication system, the method comprising:

generating, using a first output of two successive outputs, a non-data mode signal; and controlling, using a second output of said two successive outputs, the output of the non-data mode signal.

27. The method of claim 24 further comprising selecting a non-data mode input.

28. The method of claim 27 further comprising repeating the generating and controlling for as long as the non-data mode input is selected.

29. The method of claim 27 further comprising:

selecting a data communication mode input; and scrambling data received for communication.

30. The method of claim 29 wherein the transmitter is located in an ADSL modem.

31. The data communication system of claim 30 wherein the data communication mode comprises SHOWTIME.

32. The data communication system of claim 30 wherein the non-data mode comprises a Q-mode.

* * * * *

UNITED STATES PATENT AND TRADEMARK OFFICE
CERTIFICATE OF CORRECTION

PATENT NO. : 7,593,476 B2 Page 1 of 1
APPLICATION NO. : 11/416541
DATED : September 22, 2009
INVENTOR(S) : Carlson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twenty-first Day of September, 2010

David J. Kappos
*Director of the United States Patent and Trademark Office*